United States Patent
Boi et al.

(10) Patent No.: US 11,242,777 B1
(45) Date of Patent: Feb. 8, 2022

(54) GASKET FOR A VALVE OF AN INTERNAL COMBUSTION ENGINE

(71) Applicant: FREUDENBERG SEALING TECHNOLOGIES S.A.S. DI EXTERNA ITALIA S.R.L.U., Pinerolo (IT)

(72) Inventors: Alessandro Boi, Pinerolo (IT); Matteo Issoglio, Pinerolo (IT); Paolo Fervier, Pinerolo (IT)

(73) Assignee: FREUDENBERG SEALING TECHNOLOGIES S.A.S. DI EXTERNA ITALIA S.R.L.U.

( * ) Notice: Subject to any disclaimer, the term of this patent is extended or adjusted under 35 U.S.C. 154(b) by 0 days.

(21) Appl. No.: 17/201,423

(22) Filed: Mar. 15, 2021

(30) Foreign Application Priority Data

Sep. 11, 2020 (IT) .................. 102020000021592

(51) Int. Cl.
*F01L 3/08* (2006.01)
*F16K 41/04* (2006.01)
*F01L 3/20* (2006.01)

(52) U.S. Cl.
CPC ............... *F01L 3/085* (2013.01); *F01L 3/20* (2013.01); *F16K 41/04* (2013.01)

(58) Field of Classification Search
CPC ...... F01L 3/085; F01L 3/08; F01L 7/16; F01L 3/20; F16K 41/04; F16J 15/3232; F02F 11/00
See application file for complete search history.

(56) References Cited

U.S. PATENT DOCUMENTS

2009/0145393 A1* 6/2009 Sakata .................. F01L 3/08
123/188.6

* cited by examiner

*Primary Examiner* — Jacob M Amick
(74) *Attorney, Agent, or Firm* — The Belles Group, P.C.

(57) ABSTRACT

A gasket is described configured to be mounted on a valve of an internal combustion engine, having a central axis and comprising: an annular elastically deformable sealing element, having a radially internal surface having a first portion, adapted to cooperate with contact with a stem of the valve, and a second portion, configured to cooperate with contact with a guide element in a sliding manner of the aforementioned stem; and an annular support member, arranged coaxially on at least part of the sealing element so that the latter is pressed radially between the support member and the valve; the second portion has a circumferential surface section and a plurality of discrete bumps, projecting cantilevered from the circumferential surface section so as to cooperate with contact in use with the guide element, angularly spaced from each other around the axis and forming a discontinuous undulation of the radially internal surface.

10 Claims, 3 Drawing Sheets

GASKET FOR A VALVE OF AN INTERNAL COMBUSTION ENGINE

CROSS-REFERENCE TO RELATED APPLICATIONS

This patent application claims priority from Italian patent application no. 102020000021592 filed on Sep. 11, 2020, the entire disclosure of which is incorporated herein by reference.

TECHNICAL FIELD

The present invention relates to a gasket for a valve of an internal combustion engine.

BACKGROUND OF THE INVENTION

Internal combustion engines for vehicles are known, which comprise a cylinder head having one or more cylinders, inside which the working cycle is carried out, and which are placed in communication with respective combustion chambers of the engine itself. Furthermore, on the mentioned cylinder head suitable seats are formed designed to make the combustion chamber communicate with ducts adapted to carry into said chamber a mixture of unburned fuel and air ("intake ducts"), and to carry away from said combustion chamber the burned gases ("exhaust ducts").

The flows from and to each combustion chamber are controlled by suitable valves acting on the mentioned seats. In particular, each valve essentially comprises a guide element, fixed inside a cavity of the cylinder head of the engine and defining a through seat, and a stem, movable in a sliding manner in opposite directions inside the aforementioned seat and carrying at one end a cut-off portion for closing the connection between the relative intake or exhaust duct and the corresponding combustion chamber.

The opposite end of the stem of the valve projects axially from the relative guide element and is adapted to receive actuating forces from a relative control device, for example a camshaft.

The stem of the valve is axially loaded by a cylindrical helical spring in the closing direction of the connection between the relative intake or exhaust duct and the corresponding combustion chamber.

In particular, the spring is mounted coaxially around the valve and is axially interposed between a fixed surface formed on the cylinder head of the engine and a plate fixed to the stem of the valve in proximity of or at the end of the stem itself cooperating with the control device.

On the valves of the type described above, sealing gaskets are normally mounted for the lubricating oil normally circulating in the engines. Such gaskets, in one of the most commonly known embodiments, comprise a support or reinforcing member, having a substantially tubular shape and made in a single piece of metal material, and an annular sealing element, made of elastomeric material, for example of rubber, and interposed between the support member and the valve.

In particular, the sealing element typically comprises a first portion, adapted to cooperate directly with the stem of the valve, and a second portion adapted to cooperate, by means of its own annular radially internal surface, with the annular radially external surface of the portion of the guide element facing in use the mentioned control device.

The gaskets of the type described above are widely used on all the internal combustion engines for controlling the amount of lubricating oil which flows from the distribution zone to the combustion chambers. An excessive flow of lubricating oil causes, besides an evident high consumption of the oil itself, a deterioration of the engine efficiency and a performance degradation of the catalytic converter of the vehicle. On the other hand, an insufficient flow causes an increase in the wear and in the noise of the valves accompanied by the presence of local temperature peaks. These phenomena can cause a premature damage of the valves consequent on the seizure of the stem of the valves themselves inside the guide element.

The known gaskets allow, by means of the first portion of the sealing element cooperating with the stem of the relative valve, providing a dynamic type seal and, by means of the second portion of the sealing element acting on the guide element of the relative valve, providing a static type seal. In particular, the static seal must assure a certain degree of radial compression on the guide element so as to prevent the leakage of lubricating oil towards the combustion chambers and simultaneously keep the gasket in position, while the dynamic seal is designed to allow the minimum oil flow necessary for lubricating the coupling between the stem and the guide element.

The dynamic type seal is made at a section of minimum diameter of the sealing element which cooperates directly with the stem of the valve along a circumferential line of contact.

Instead, the static type seal is made, in a known solution, by means of a plurality of annular undulations of reduced radial height, formed on the radially internal surface of the sealing element and arranged in succession to one another along the axis of the gasket.

The applicant has observed that, during the mounting of the gasket of the known type described above, which is made fitting externally from above the gasket on the guide element of the relative valve and subsequently inserting the stem through the gasket and the guide element, it can occur that, at the release of the axial thrust by the operator, the sealing element, due to the intrinsic characteristics of the rubber, can move in axial direction slightly upwards, i.e. towards the end of the stem which cooperates in use with the control device (phenomenon known as spring-back): basically, the rubber is loaded by compression during the mounting manoeuvre and releases the elastic force accumulated at the end of the manoeuvre itself.

This slight axial movement can cause the gasket not to operate in its optimal position with a consequent drawback of the sealing properties and functioning instability (the gasket is not firmly anchored to the valve in a defined position).

SUMMARY OF THE INVENTION

The object of the present invention is thus to provide a gasket for a valve of an internal combustion engine, which allows, in a simple and cost-effective manner, overcoming the above specified drawback.

The aforementioned object is achieved by the present invention, as the latter relates to a gasket for a valve of an internal combustion engine, as defined in claim 1 and in the claims dependent thereon.

BRIEF DESCRIPTION OF THE DRAWINGS

To better understand the present invention, a preferred embodiment is described in the following, by way of non-limiting example and with reference to the accompanying drawings, wherein.

DETAILED DESCRIPTION OF THE INVENTION

Figure 1:
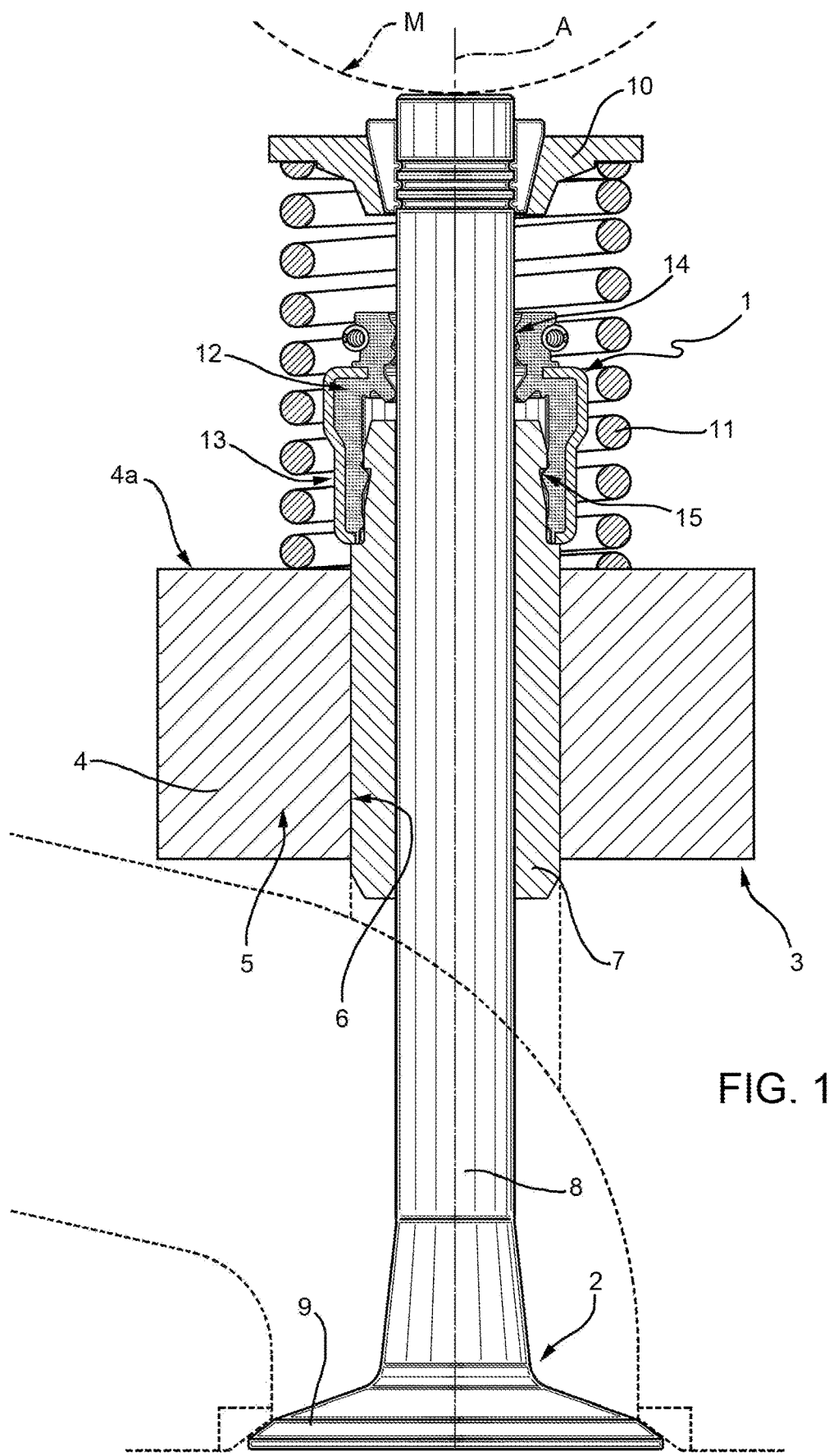
FIG. 1 illustrates, in axial section, a gasket made according to the present invention and mounted on a valve of an internal combustion engine.
Figure 3:
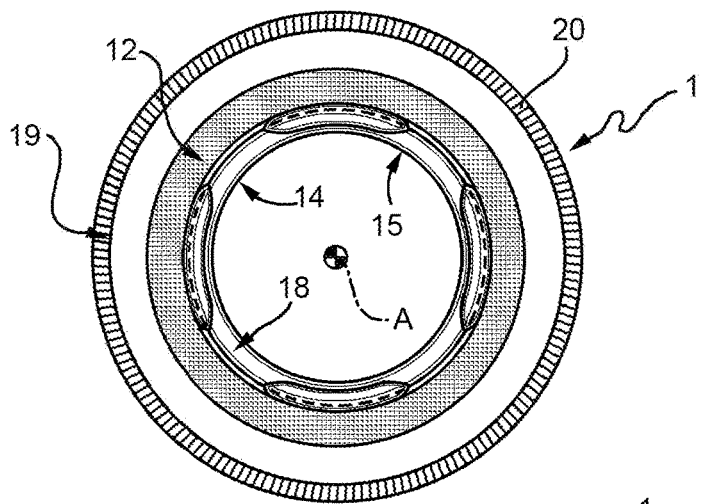
FIG. 3 illustrates a section according to the line of FIG. 2.

With reference to Figures from 1 to 5, reference numeral 1 indicates, as a whole, a gasket according to the present invention for a valve 2 of an internal combustion engine 3, known per se and illustrated in FIG. 1 only for what necessary for understanding the present invention.

More specifically, in FIG. 1, the engine 3 is illustrated limitedly to a portion 4 of a cylinder head 5, which defines in a known manner a combustion chamber (not illustrated in FIG. 1 but arranged below the portion 4 of the cylinder head 5 illustrated), inside which a fuel is oxidized in the presence of comburent air so as to transform the chemical energy contained in the fuel into pressure energy.

The combustion chamber receives in a known manner, through its own opening, a mixture comprising the fuel and the comburent air and discharges, through another opening, the burned gas and air at the end of the combustion process.

The flows from and to the combustion chamber are controlled by respective valves 2 of the aforementioned type, acting on the mentioned openings of the combustion chamber.

The following description will refer for simplicity to one single valve 2, it being understood that the same characteristics described are present in each valve of this type used in the engine 3.

With reference to FIG. 1, the valve 2 is housed in a through seat 6 of axis A, which is formed in the portion 4 of the cylinder head 5 and normally contains lubricating oil.

The valve 2 comprises a tubular guide element 7 fitted via interference inside the seat 6, and a stem 8 movable in a sliding manner according to opposite directions along the axis A inside the guide element 7.

More specifically (FIGS. 1 and 5), the stem 8 projects axially from opposite sides of the guide element 7 and is provided, at its own opposite axial ends, respectively with a cut-off element 9, designed to fluid sealingly engage the relative opening in the combustion chamber, and with an actuating element or plate 10 adapted to receive actuating forces from a control mechanism M, known per se and illustrated only partially with a broken line in FIG. 1, for example a camshaft.

On the axial end portion of the guide element 7, from where the end of the stem 8 provided with the plate 10 projects, a relative gasket 1 according to the invention is externally fitted, surrounding coaxially both the guide element 7 and the stem 8.

The valve 2 further comprises a spring 11 (FIG. 1), in this illustrated case of helical type, which cooperates, at its own axial ends opposite one another, with the plate 10 and with an annular fixed surface 4a of axis A of the portion 4 of the cylinder head 5.

The spring 11 is adapted to generate an elastic restoring force on the stem 8 such to maintain it always in contact, at the plate 10, with the control mechanism.

Figure 2:
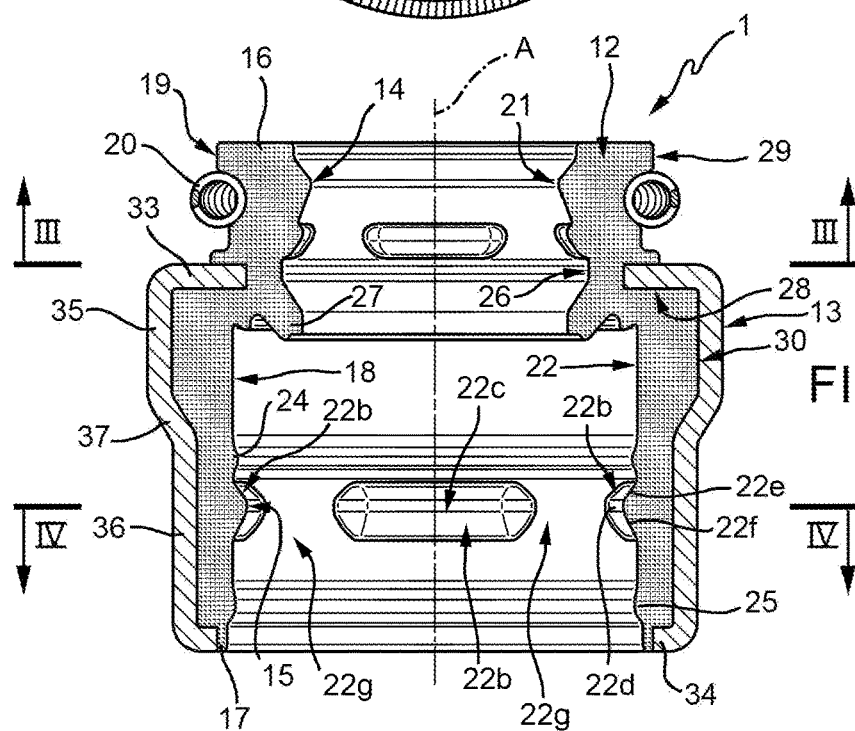
FIG. 2 illustrates, in axial section and on an enlarged scale, the gasket of FIG. 1.

With reference to FIGS. 1 and 2, the gasket 1 has an annular shape with respect to an axis coinciding, in mounting conditions, with the axis A.

More specifically, the gasket 1 essentially comprises a sealing element 12, having an annular shape and made of elastomeric material, for example of rubber, and a support member 13 arranged coaxially on the sealing element 12 so as to press the latter, in radial direction with respect to the axis A, on the guide element 7 and on the stem 8 of the valve 2. Basically, the sealing element 12 is interposed coaxially between the support member 13 and the valve 2.

The sealing element 12 initially defines, proceeding along the axis A towards the cut-off element 9 of the stem 8, a dynamic type seal 14 adapted to allow the passage of a minimum oil flow necessary for lubricating the coupling between the stem 8 and the guide element 7, and subsequently a static type seal 15 for preventing the oil flow towards the combustion chamber.

More specifically (FIG. 2), the sealing element 12 is delimited by two annular discoid sections 16, 17 of axial end, opposite one another, by a radially internal surface 18, adapted to cooperate in part with the stem 8 and in part with the guide element 7 so as to create the sealings 14 and 15, and by a radially external surface 19, adapted to couple to the support member 13 and to an annular elastic collar 20 so as to press the radially internal surface 18 on the stem 8.

The section 16, in mounting conditions, faces the plate 10 and is traversed by the stem 8; the section 17, in mounting conditions, faces the combustion chamber, and is in contact with the guide element 7 inside which the stem 8 slides.

The radially internal surface 18 of the sealing element 12 comprises, in a position adjacent to the section 16, a section 21 of minimum diameter, configured to be pressed radially in use by the elastic collar 20 against the stem 8 so as to define a circumferential line of dynamic type seal (seal 14), which allows, thanks to the coupling in a sliding manner to the stem 8, the outflow of a minimum oil flow.

The radially internal surface 18 of the sealing element 12 further comprises, in a position adjacent to the section 17, a portion 22 approximately cylindrical, configured to cooperate with contact with, and be pressed in use radially by the support member 13 against, the guide element 7 so as to define a cylindrical area of static type seal (seal 15).

Advantageously (FIGS. 1, 2, 4 and 5), the portion 22 has a circumferential surface section 22a, in this illustrated case approximately cylindrical, and two or more discrete bumps 22b, in this illustrated case four, projecting cantilevered from the circumferential surface section 22a so as to cooperate with contact in use with the guide element 7, equally spaced angularly from one another around the axis A, annularly aligned with one another at a predetermined axial position along the axis A and forming a discontinuous undulation 22c of the radially internal surface 18.

Figure 4:
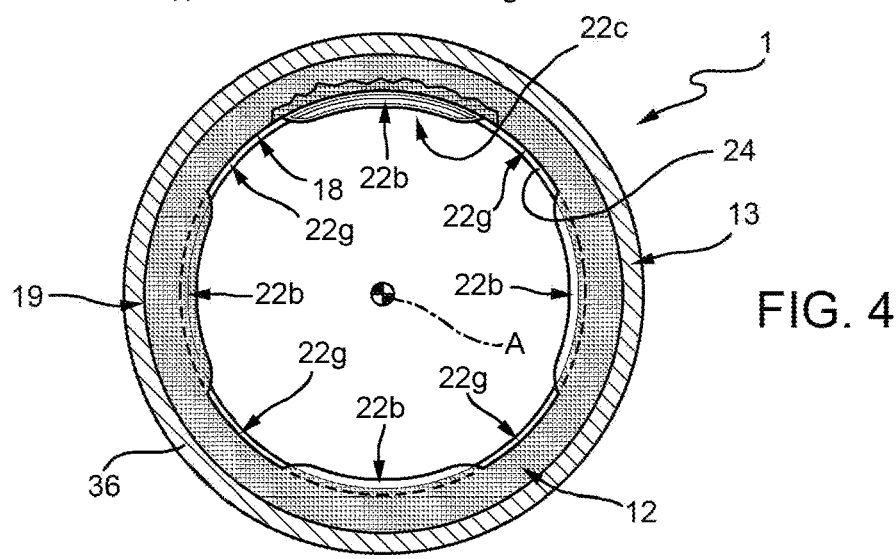
FIG. 4 illustrates a section according to the line IV-IV of FIG. 2.

In particular, the bumps 22b are configured to engage in use an annular groove 23 of the guide element 7 (FIGS. 1 and 4).

As illustrated in detail in FIGS. 2 and 4, each bump 22b is angularly separated from the adjacent bump 22b by an empty gap 22g. Preferably, each bump 22b has an angular extension with respect to the axis A greater than the angular extension of the respective empty gap 22g.

As illustrated in detail in FIGS. 1, 2, 4 and 5, each bump 22b has, in cross-section with a plane passing through the axis A, a V-shaped configuration with a rounded vertex defining a respective crest 22d of the bump 22b.

More specifically, the crest 22d of each bump 22b has, with reference to the axis A, a smaller diameter than the diameter of the circumferential surface section 22a.

Figure 5:
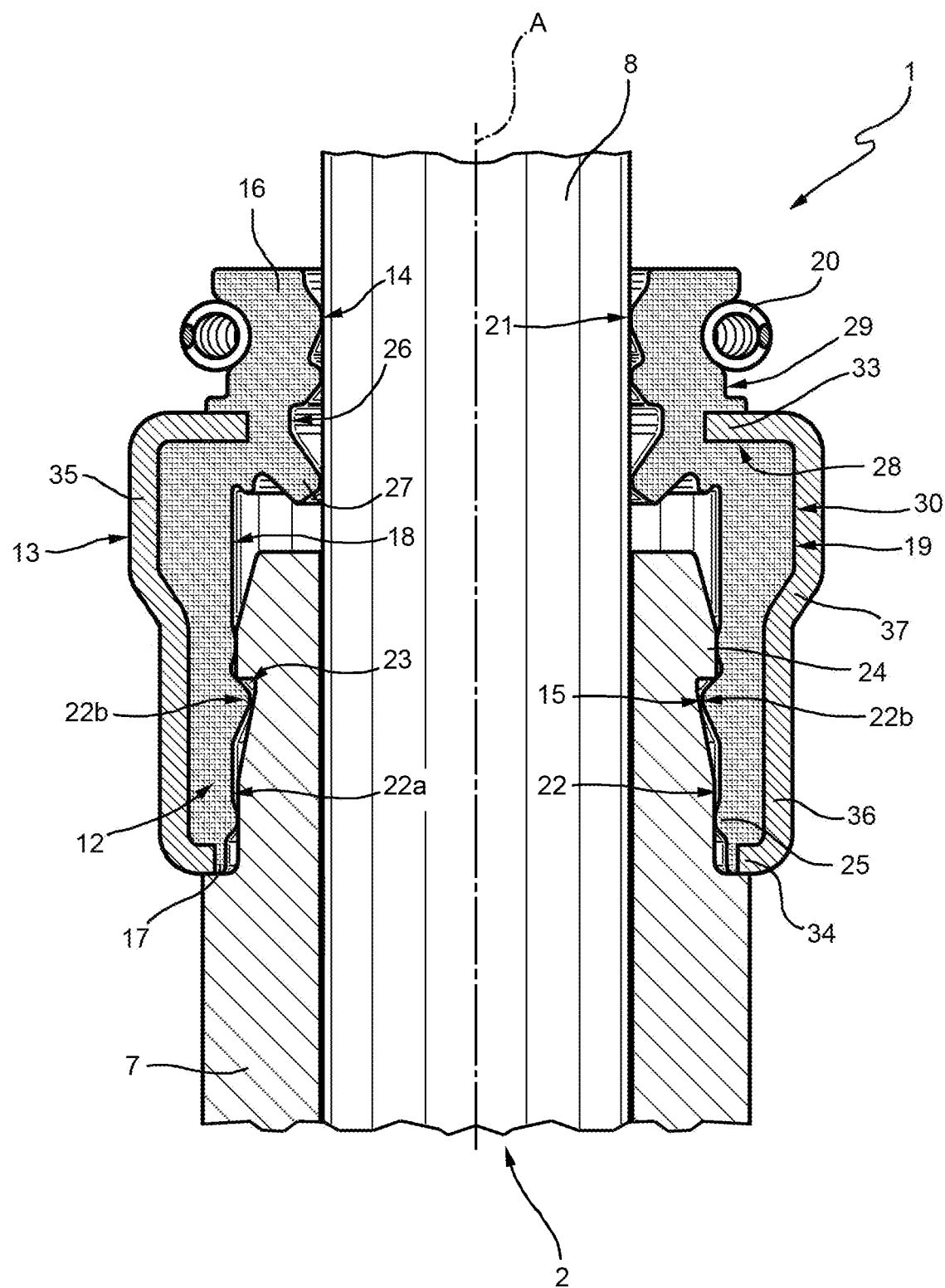
FIG. 5 illustrates, in axial section and on an enlarged scale, the gasket of FIG. 1 and the part of the valve on which it is mounted.

Furthermore, each bump 22b has two sides 22e, 22f arranged on axially opposite sides with respect to the crest 22d and converging with one another towards the crest 22d (FIGS. 2, 4 and 5).

As illustrated in FIGS. 2, 4 and 5, the portion 22 further comprises first and second annular projections 24, 25 arranged on axially opposite sides of the bumps 22b and axially spaced by the bumps 22b themselves.

The radially internal surface 18 of the sealing element 12 further comprises, in interposed position between the section 21 and the portion 22, a further portion 26 carrying cantilevered a gas sealing lip 27 cooperating in use with the stem 8 of the valve 2

The lip 27 has a substantially truncated-conical shape of axis A having decreasing section in a direction opposite the pressure forces generated in use by the gases directed towards the section 21; in this illustrated case, the lip 27 has a decreasing section towards the portion 22.

As illustrated in FIGS. 1, 2 and 5, the lip 27 is connected to the portion 26 of the radially internal surface 18 of the sealing element 12 at its own side having greater section. Such connection defines a sort of virtual hinge between the lip 27 and the radially internal surface 18 of the sealing element 12.

The radially external surface 19 of the sealing element 12 defines, in a position axially interposed between the section 21 and the portion 26 of the radially internal surface 18, a recess 28, whose function will be clarified in the following; the recess 28 divides the radially external surface 19 into a portion 29 housing the elastic collar 20, extending towards the section 16, and into an elongated portion 30 extending towards the section 17 and adapted to couple, together with the recess 28, to the support member 13.

Always with reference to FIGS. 1, 2 and 5, the support member 13 is preferably made of metal material and is composed of a bush of an approximately cylindrical shape elongated with respect to axis A. In particular, the support member 13 cooperates with the elongated portion 30 of the radially external surface 19 of the sealing element 12 and essentially comprises: a first annular discoid end portion 33, extending in a radial direction with respect to the axis A and partially embedded in use in the recess 28 of the sealing element 12; a second opposite end portion 34, slightly curved towards the axis A so as to axially retain the sealing element 12 at the section 17 of the latter; a first cylindrical portion 35 extending cantilevered from a radially external end of the end portion 33 towards the end portion 34; and a second cylindrical portion 36 extending from the end portion 34, having external and internal diameters smaller than the external and internal diameters of the cylindrical portion 35 and connected to the latter by means of a connection section 37 having a truncated-conical shape.

Basically, the support member 13 has increasing radial bulks with respect to the axis A proceeding from its own end portion 34 to then radially curve inside the recess 28 of the sealing element 12 at the opposite end portion 33.

Examining the characteristics of the gasket 1 manufactured according to the present invention, the advantages that it allows obtaining are evident.

In particular, in the mounting step of the gasket 1 on the guide element 7 of the valve 2 starting from the top, the bumps 22b engage with the groove 23 of the guide element 7; thanks to the presence of the empty gaps 22g between the bumps 22b, the elastomeric material composing the sealing element 12 can relax during the mounting thus mitigating or limiting the spring-back phenomenon once concluded the axial thrust step on the gasket 1 so as to cause the fixing of the latter on the guide element 7 of the valve 2.

In this manner, it is possible to arrange the gasket 1 in the intended position on the guide element 7 of the valve 2 generating increased retention and greater functioning stability.

Finally, it is evident that modifications and variants can be made to the gasket 1 described and illustrated herein without departing from the protection scope defined by the claims.

The invention claimed is:

1. Gasket for a valve of an internal combustion engine; said valve comprising a guide element defining a through seat, and a stem movable in a sliding manner in said seat; said gasket having a central axis and comprising:

an elastically deformable sealing element, having an annular shape with respect to said axis and adapted to be arranged externally on said valve to cooperate both with said guide element and with said stem; and a support member having an annular shape with respect to said axis, arranged coaxially on at least part of said sealing element so that the latter is pressed radially between said support member and said valve;

wherein said sealing element is delimited by a radially external surface, cooperating with contact at least in part with said support member, and by a radially internal surface having a first portion, configured to cooperate with contact in use with said stem so as to define with the stem itself a dynamic type seal, and a second portion, configured to be pressed in use radially by said support member against said guide element so as to define a static type seal with the guide element itself;

wherein said second portion has a circumferential surface section and a plurality of discrete bumps, projecting cantilevered from said circumferential surface section to cooperate with contact in use with said guide element, angularly spaced from each other around said axis, annularly aligned with each other at a predetermined axial position along the axis itself and forming a discontinuous undulation of the radially internal surface.

2. Gasket according to claim 1, wherein said circumferential surface section has an approximately cylindrical shape.

3. Gasket according to claim 1, wherein said bumps are equally spaced angularly from each other.

4. Gasket according to claim 1, wherein each bump has, in cross section with a plane passing through said axis, a V-shaped configuration with a rounded vertex defining a respective crest of the bump itself.

5. Gasket according to claim 4, wherein the crest of each said bump has, with reference to said axis, a smaller diameter than the diameter of said circumferential surface section.

6. Gasket according to claim 4, wherein each said bump has two sides arranged on axially opposite sides with respect to said crest and converging towards the crest itself.

7. Gasket according to claim 1, wherein each bump is angularly separated from the adjacent bump by an empty gap.

8. Gasket according to claim 7, wherein each bump has an angular extension with respect to said axis greater than the angular extension of the adjacent empty gap.

9. Gasket according to claim 1, wherein said second portion comprises first and second annular projections arranged on axially opposite sides of said bumps and axially spaced by the bumps themselves.

10. Gasket according to claim 1, wherein said bumps are configured to engage in use an annular groove of said guide element.

\* \* \* \* \*